Oct. 30, 1934  W. H. DELAHAYE  1,978,697
ADJUSTING DEVICE
Filed Aug. 14, 1931
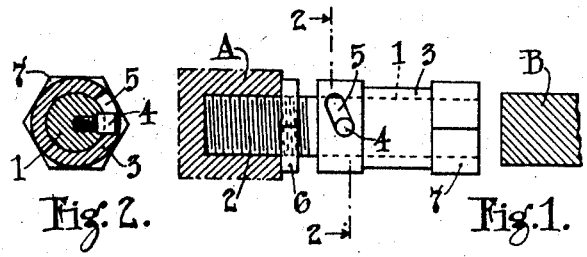
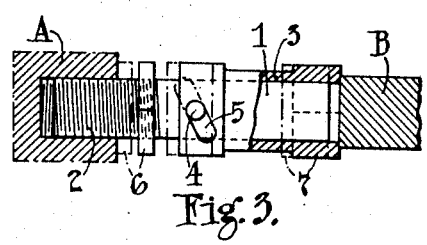
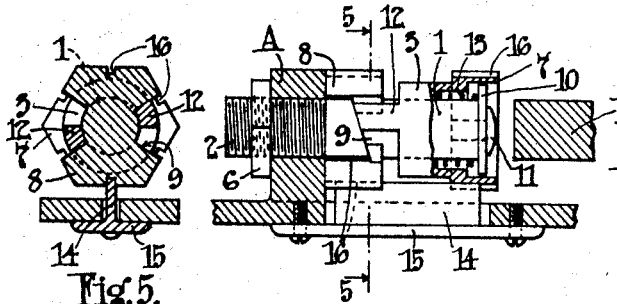
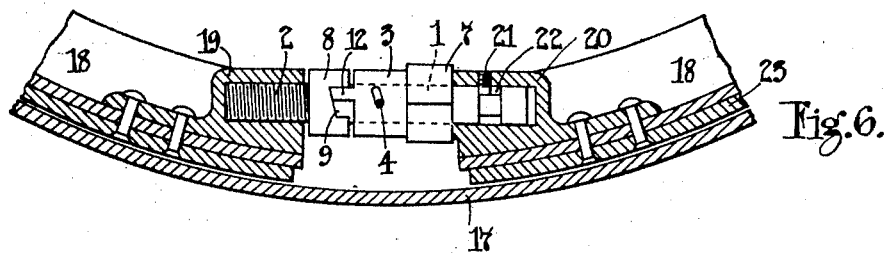
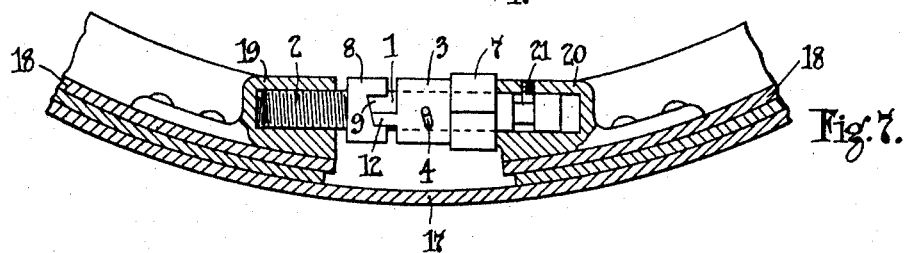
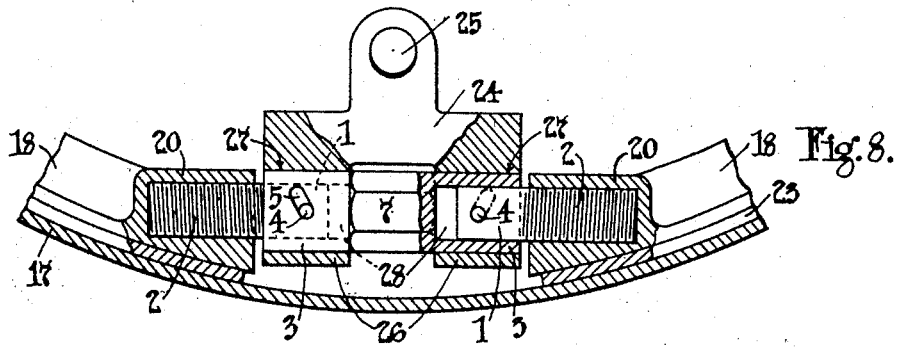
INVENTOR:
WALTER H. DELAHAYE
ATTORNEY.

Patented Oct. 30, 1934

1,978,697

UNITED STATES PATENT OFFICE 1,978,697

ADJUSTING DEVICE

Walter H. Delahaye, Ottawa, Ontario, Canada, assignor to Bendix Brake Company, South Bend, Ind., a corporation of Illinois Application August 14, 1931, Serial No. 557,021

15 Claims. (Cl. 188—79.5)

This invention relates to devices for effecting adjustment of various members. The improved device is particularly applicable to brakes for the purpose of adjusting the clearance between the brake shoes and drum but is not limited to such use.

When the clearance between two members is to be adjusted it is usual to employ some kind of gauge, and the object of the invention is to provide a reliable device of simple construction whereby the desired adjustment can be rapidly effected without employing any separate gauging means.

According to the invention the device includes a screwthreaded member on which is loosely mounted a sleeve or equivalent device which is capable of a predetermined axial movement with respect to the threaded member. This axial movement is equal to or proportional to the desired clearance. Subsequent rotation of the threaded member obliterates the clearance, and as the sleeve is free to move back to its normal position in relation to the threaded member the required clearance is thus accurately and quickly obtained.

The invention consists in the construction, combination and arrangement of parts hereinafter described and more particularly pointed out in the appended claims.

Referring now to the accompanying drawing which illustrates, by way of example, several convenient embodiments of the invention, Figure 1 is a side elevation of one form of the improved adjusting device;

Figure 2 is a section on line 2—2 of Figure 1;

Figure 3 is a side elevation, partly in section, showing the parts in another position;

Figure 4 is a side elevation, partially in section, of a modified form of the invention;

Figure 5 is a section on line 5—5 of Figure 4;

Figures 6 and 7 are fragmentary sectional elevations of a third form of the invention, showing the parts in two different positions, and Figure 8 is a fragmentary sectional elevation of a still further modification.

According to Figures 1 to 3, the device comprises a stud 1 screwthreaded at one end at 2. A sleeve 3 is loosely mounted on the stud 1 in such a manner as to have a predetermined longitudinal and rotary movement with respect to the stud. A radial pin 4 mounted on the stud 1 engages an inclined or helical slot 5 in the sleeve 3.

The stud 1 is screwed into a member A and the outer end of the sleeve 3 cooperates with a member B. The object of the device is to provide means for effecting a quick and accurate adjustment of the clearance between the sleeve 3 and member B.

If desired, a locknut may be provided on the stud 1 as indicated at 6.

The pin and slot connection 4—5 is so designed that the maximum longitudinal movement of the sleeve 3 with respect to the stud 1 when the sleeve is rotated is equal to the desired clearance between the sleeve and the member B. The normal position is indicated in Figure 1. Should the clearance become too great, the locknut 6, if provided, is slackened and the sleeve 3 is rotated, for example, by means of a spanner applied to a hexagonal head 7 on the sleeve. The pin and slot connection permits the sleeve to advance towards the member B with respect to the stud 1 by an amount equal to the desired clearance. The continued rotation of the sleeve causes the stud 1 to be screwed out of the member A until the sleeve 3 engages the member B (see full lines in Figure 2). The rotation of the sleeve 3 is then reversed as far as is permitted by the pin and slot connection and the locknut 6 is screwed into locking engagement with the member A (see dotted lines, Figure 2). The desired clearance is thus very quickly and accurately obtained. Should the clearance become too small the stud 1 is momentarily screwed into the member A to make the clearance excessive before the above described adjustment is effected.

In Figures 4 and 5 a stronger form of the device is shown. The stud 1 is formed with a hexagonal or other suitable head 8 formed with one or more cam-like recesses 9. The sleeve 3 is loosely mounted on the stud 1 and retained thereon by any suitable means such as a washer 10 held on the end of the stud 1 by a headed screw 11. The sleeve 3 is provided with lugs or projections 12 coacting with the inclined bottom surfaces of the recesses 9. If desired, a light spring 13 may be compressed between the washer 10 and a shoulder on the sleeve 3, in order to return the sleeve automatically to the normal position indicated in Figure 4.

A locknut 6 may be provided on the stud 1, or, alternatively, the stud 1 and sleeve B may be locked more positively in the adjusted position by a stationary plate or tongue 14. The tongue 14 may be carried by a plate 15 secured to the member A, and engages slots 16 in the hexagonal heads 7 and 8 on the sleeve and stud respectively.

The operation of this device will be apparent without detailed description. The plate 15 is removed and the sleeve is rotated as previously described. The cam action of the recesses 9 on the lugs 12 move the sleeve axially a distance equal to the desired clearance, and the sleeve and stud then move together until the sleeve engages the member B. The sleeve is then released and the spring 13 returns the sleeve to normal position, automatically providing the desired clearance. The locking tongue 14 is then engaged with aligned slots in the heads 7 and 8. The accuracy of adjustment of this form is limited to one sixth of a revolution, but a larger number of slots 16 may be provided if necessary to provide greater accuracy.

In Figures 6 and 7 the same principle is employed to adjust the length of a brake shoe. A brake drum is indicated at 17 and the adjacent ends of two brake shoe sections are shown at 18. Secured to the shoe sections 18 are socket members 19 and 20 formed with aligned bores, the bore in the member 19 being screwthreaded. The stud 1 is screwed into the socket 19 and projects loosely through the sleeve 3 into the socket 20. The sleeve 3 has a lug 12 engaging a cam recess 9 as in Figure 4. A pin and slot connection 4 may also be provided if desired to retain the sleeve on the stud. A pin 21 may be mounted in the socket 20 to engage a recess 22 in the stud 1. The normal position of the parts is shown in Figure 6. If the clearance between the brake lining 23 and the drum 17 becomes too great, the sleeve 3 is rotated to screw the screw 2 out of the socket 19 the required amount. The initial rotation of the sleeve 3 thrusts the shoe sections 18 apart a distance determined by the length and inclination of the recess 9, and the rotation is then continued until the lining 23 engages the drums 17 (see Figure 7). The usual springs (not shown) then withdraw the shoe sections 18 from the drum and the parts are thus returned to normal position, automatically providing the required clearance.

Figure 8 illustrates the invention applied to an anchoring device for a pair of brake shoes. A block 24 is anchored at 25 to the usual brake flange, and is formed with a pair of spaced lugs 26 having aligned bores 27. The sleeve 3 is rotatably mounted in the bores 28 and the polygonal head 7 is arranged between the lugs 26. Two oppositely screwthreaded studs 1 are slidably mounted in bores 28 in the sleeve and connected thereto by oppositely arranged pin and slot connections 4, 5. The studs are screwed into sockets 20 on the shoes or shoe sections 18. The operation of this modification will be clear from the preceding description.

It will be seen that the invention provides a simple device which may be used for many different purposes where a set clearance between two members is to be maintained substantially constant.

The foregoing description and accompanying drawing are given by way of example only and other modifications within the scope of the appended claims may be resorted to without departing from the invention.

I claim:

1. An adjusting device comprising a screwthreaded stud, and a member mounted on said stud so as to be capable of a predetermined, limited axial movement with respect to said stud and thereafter being operable to turn the stud to adjust it.

2. An adjusting device comprising a member screwthreaded at one end, a sleeve mounted on the other end of said member, and means for limiting the axial movement of said sleeve with respect to said member.

3. An adjusting device comprising a stud screwed at one end, a sleeve rotatably mounted on said stud, and means for causing a predetermined axial movement of said sleeve with respect to said stud when the sleeve is rotated on said stud.

4. An adjusting device comprising a stud screwthreaded at one end, a sleeve rotatably and slidably mounted on the other end of said stud and forming an abutment at its outer end, and means for loosely coupling said stud and sleeve together and for causing said sleeve to have an axial relative movement of predetermined extent when the sleeve is rotated, the sleeve being free to return subsequently to its normal position with respect to said stud.

5. A device for adjusting the clearance between two members comprising screwthreaded means, and a cam device and means for coupling the screwthreaded means and cam device in such manner that the initial movement of the cam device reduces the existing clearance by an amount equal to the desired clearance, the continued movement of the cam device causing rotation of the screwthreaded means until the clearance is extinguished, the cam device being free to return to its normal position with respect to the screwthreaded means.

6. A brake having adjustable friction means and having associated therewith, inside the brake, a member movable to make the adjustment, and an operating device therefor manually movable while the brake is released to take up a predetermined clearance equivalent to the normal clearance of the brake when released, without adjusting said member, and thereafter further movable to operate said member to make a permanent adjustment to take up any remaining clearance.

7. A device for adjusting a clearance such as the clearance between a brake shoe and a brake drum by increasing the distance between two parts, and comprising a connection adjustably engaging one of said parts and abutting the other of said parts, and an operating device engaging said connection and said other part and which is operable in two stages, in the first of which it moves independently of the connection and shifts the connection with respect to said other part sufficiently to take up a predetermined clearance, and in the second of which it adjusts the connection to take up any remaining clearance.

8. A device for adjusting a clearance such as the clearance between a brake shoe and a brake drum by increasing the distance between two parts, and comprising a connection threaded into one of said parts and abutting the other of said parts, and an operating device engaging said connection and said other part and which is operable in two stages, in the first of which it moves independently of the connection and shifts the connection with respect to said other part sufficiently to take up a predetermined clearance, and in the second of which it turns the connection to take up any remaining clearance.

9. A pair of brake shoes having a floating thrust connection therebetween adjustable to separate said shoes to take up for wear, and an operating device operable when the brake is released and having a first stage of movement and arranged during said first stage to seperate said shoes a predetermined amount corresponding to the normal clearance of the shoes when the brake is released, without changing the adjustment, and having a second stage of movement and arranged during said second stage to adjust said connection to separate said shoes.

10. A brake anchor and a brake shoe having a connection therebetween adjustable to separate said shoes to take up for wear, and an operating device having a first stage of movement and arranged during said first stage to separate said shoe from said anchor a predetermined amount and having a second stage of movement and arranged during said second stage to adjust said connection to separate said shoe from said anchor.

11. A pair of brake shoes having a connection carried by and floating with the shoes and adjustable to separate said shoes to take up for wear, and an operating device intended and arranged for actuation when the brake is released and having a first stage of movement and arranged during said first stage to separate said shoes a predetermined amount corresponding to the normal clearance of the shoes when released, without affecting the adjustment, and having a second stage of movement and arranged during said second stage to adjust said connection to separate said shoes.

12. A pair of brake shoes and an anchor adjacent said shoes, in combination with an adjustment between each shoe and the anchor, and operating means moving in a first stage in which it separates the shoes a predetermined amount from the anchor without affecting the adjustments and thereafter moving in a second stage in which it actuates the adjustments.

13. A pair of brake shoes and an anchor adjacent said shoes, in combination with an adjustment between each shoe and the anchor, and an operating device moving in a first stage in which it separates both shoes a predetermined amount from the anchor without affecting the adjustments and thereafter moving in a second stage in which it actuates both adjustments simultaneously.

14. An adjusting device comprising a member threaded at one end and having a thrust portion at its other end, and an operating device mounted on said member and having a short lost motion with respect thereto during which it is shifted toward the end of said member and which is thereafter operable to turn said member.

15. An adjusting device comprising a member threaded at one end and having a thrust portion at its other end, and an operating device mounted on said member and having a short lost motion with respect thereto during which it is shifted toward the end of said member and which is thereafter operable to turn said member, and which has a thrust portion at the end nearest the thrust portion of said member.

WALTER H. DELAHAYE.